United States Patent

[11] 3,600,793

[72] Inventor John E. Masters
 Barrington, Ill.
[21] Appl. No. 825,287
[22] Filed May 16, 1969
[45] Patented Aug. 24, 1971
[73] Assignee Pre Finish Metals, Inc.
 Elk Grove Village, Ill.

[54] METHOD OF MANUFACTURING FINISHED WELDED TUBING
 3 Claims, 7 Drawing Figs.
[52] U.S. Cl. .................................................. 29/430,
 29/475
[51] Int. Cl. ............................................. B23p 19/00,
 B23k 31/02
[50] Field of Search .......................................... 29/430,
 200, 429, 417, 475

[56] References Cited
UNITED STATES PATENTS
3,332,138 7/1967 Garner ..................... 29/430
3,394,450 7/1968 Gill et al. ..................... 29/430

Primary Examiner—Thomas H. Eager
Attorney—Darbo, Robertson & Vandenburgh

ABSTRACT: Flat prefinished metal strip is continuously converted to prefinished tube in a tube forming and welding process which includes continuous application of a film matching strip to the tubing in the region of the weld while the tubing is still hot from the welding operation. The film strip includes a surface which is at least partially heat-fusible at the temperature of the tubing surface at the point at which the film strip is applied and is adherent thereto.

PATENTED AUG 24 1971  3,600,793
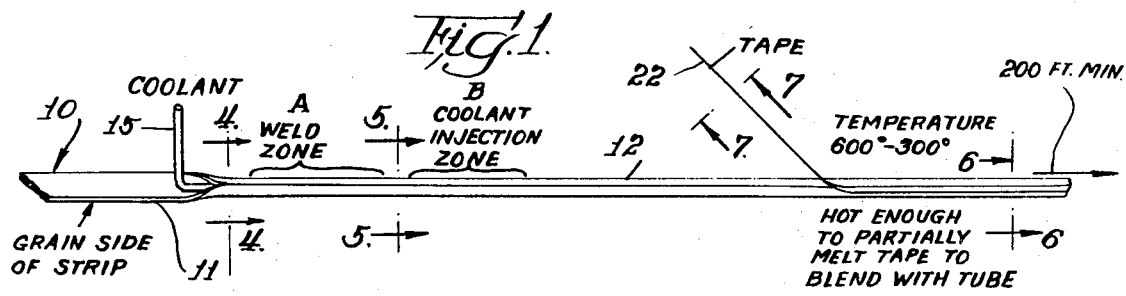
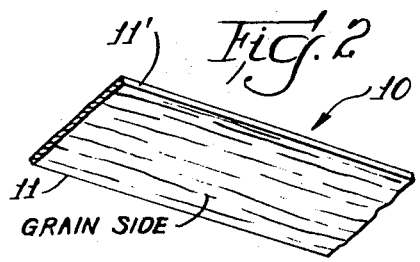
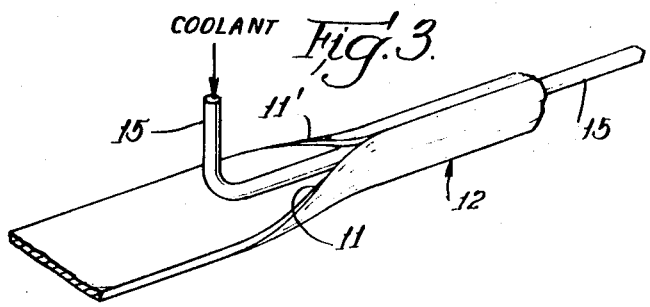
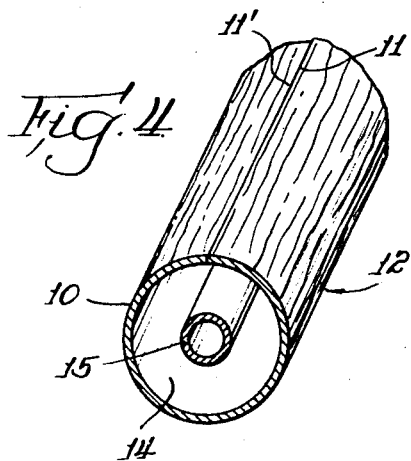
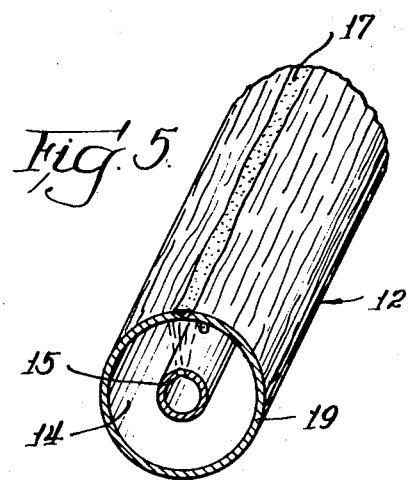
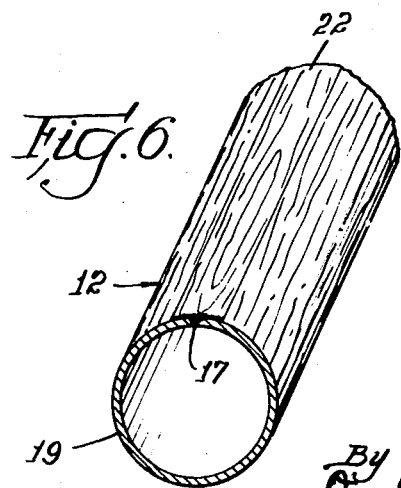
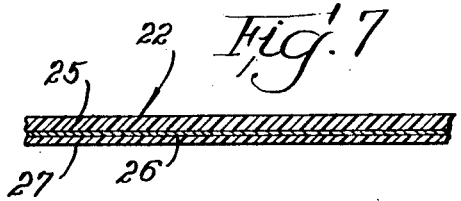
Inventor
John F. Masters
By
Darbo, Robertson & Vandenburgh
Att'ys.

METHOD OF MANUFACTURING FINISHED WELDED TUBING

BACKGROUND OF THE INVENTION

Equipment and methods for converting continuous metal strip to round welded tube are well known. However, it is highly desirable to provide metal tubing which is prefinished either in solid decorative colors or with complex finishes such as those resembling wood grain. Such decorated tubing is useful in the fabrication of ironing boards, lawn equipment and the like. However, I know of no satisfactory way of incorporating a complex finish such as a wood grain finish around the entire circumference of a metal tube. Moreover, conversion of a prefinished elongated metal strip into a welded tube in accordance with methods heretofore available result in an unfinished weld line with either bare metal or burnt plastic along the side thereof.

It is an object of this invention to provide an innovation which is readily adaptable to conventional welded tube forming processes, which innovation results in a welded tube which is finished around the entire circumference thereof. It is particularly an object of this invention to provide a method of converting elongated flat metal strip into welded tubing having a wood grain finish around the entire circumference thereof.

SUMMARY OF THE INVENTION

In accordance with this invention, elongated prefinished metal strip is continuously converted to prefinished welded tube. The prefinished metal strip is formed into a tube and welded in accordance with conventional technology. However, immediately after the edges are welded together and while the weld line and the region immediately adjacent thereto are still hot as a result of the welding step, and organic film which matches the finish of the metal strip and has one surface which is at least partially fusible at temperatures between 300° and 600° Fahrenheit is applied to the welded tubing at a point at which the welded tubing is cool enough to be tolerated by the organic strip, and yet high enough to at least partially fuse the contacting surface to cause the film to adhere to the tubing.

DESIGNATION OF THE FIGURES OF THE DRAWING

FIG. 1 is a schematic view illustrating the various stages or steps of the overall method starting with elongated metal strip and ending with completely finished welded tube.

FIG. 2 is a perspective view showing a portion of the elongated metal strip which is converted to welded tube in accordance with this invention.

FIG. 3 is an enlarged perspective view illustrating the conventional forming step in which the elongated metal strip is shaped to tube configuration.

FIG. 4, is a schematic cross-sectional perspective view of a portion of the continuous worked metal as viewed approximately along the line 4—4 of FIG. 1.

FIG. 5 is also a perspective schematic cross-sectional view of a portion of the continuous worked material as is viewed approximately along the line 5—5 of FIG. 1.

FIG. 6 is a schematic perspective cross-sectional view taken approximately along the line 6—6 of FIG. 1.

FIG. 7 is a greatly enlarged cross-sectional view of a small portion of a cross section taken approximately along the line 7—7 of FIG. 1.

DESCRIPTION OF PREFERRED EMBODIMENTS

Although the following disclosure offered for public dissemination, in return for the grant of a patent, is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

In accordance with this invention flat prefinished strip, generally 10, is shaped to generate a substantially circular cross section whereby opposing edges 11, 11' are brought into abutting relation and continuously welded together. Inasmuch as apparatus is well known for accomplishing the forming and welding step it is not shown on the accompanying drawings. In conventional methods the tube may be scarfed or scraped immediately prior to the welding operation in order to remove metal oxide and provide smooth surface for the welding operation. In accomplishing these conventional steps the flat metal strip is usually fed continuously into the forming and welding equipment at a relatively high speed, for example, 200 feet per minute. The temperatures of the metal at the point of weld are very high, e.g., 2000° Fahrenheit and this temperature is conventionally brought down suddenly through the use of coolant liquids, e.g., oil, which is brought into the interior 15 of the newly formed welded tube by means of a conduit 15. Thus, conduit 15 is maintained fixed with respect to the forming and welding equipment although the newly formed tube moves at a high rate with respect to it. In FIG. 1, Zone A illustrates the region in which the welding occurs, and Zone B, the region of coolant injection. Hence coolant is injected into the interior 15 immediately beyond or downstream from the weld Zone A. Thus, some of the heat of the weld line 17 is removed from the welded tube 12 by coolant, and some is carried circumferentially through metal tube wall 19. Thus as the newly formed tube travels along at high speed, e.g. 200 feet per minute, the temperature at any one point is more or less constant, there being a rapidly falling gradient beginning at the point at which coolant is injected. Thus, as the newly formed tube travels through the equipment it passes through a zone in which the immediate region of the weld line 17 has surface temperatures in the range 300° to 600° Fahrenheit and this zone is fixed, for a given set of operating conditions, with respect to the forming and welding equipment.

In accordance with this invention a special tape 22, i.e., one which matches in appearance the finish of the metal strip, is applied to the heated region in that zone in which the temperature is 300° to 600° Fahrenheit. The special tape which is used in accordance with this invention is at least one-half mil and preferably less than two mils in thickness. Tapes which are less than one-half mil in thickness generally do not have sufficient strength for use in accordance with this invention. Tapes substantially in excess of two mil thickness are wasteful of material, and moreover provide edges thereof which are too thick to be readily concealed.

In accordance with a preferred embodiment of this invention in which a wood grain finished tubing is prepared, the metal strip is provided with a wood grain finish and the tape comprises a laminate plastic film 25, which is substantially transparent, having matching wood grain printing 26 on one side thereof and also includes a layer 27 of high melt adhesive on the printed side of the tape.

The preferred tape is thus applied by any conventional equipment for applying tape, e.g. under a compression roller to the heated region of the tubing in which the temperature is in the 300° to 600° range. Thus, the high melt adhesive used on the special tape must be one of the conventional high melt adhesives which is activated by temperatures in the 300° to 600° range. The adhesive layer 27 is thus partially fused thereby integrating the tape 22 and the heated surface of wall 19 after the temperatures fall below the solidification temperatures of the particular adhesive.

Conventionally tubing formed by the continuous butt welding equipment is cut into standardized lengths shortly after the tubing is formed. The coolant is discharged from the segments of finished, cut, butt-welded tubing, and is filtered and recirculated. I have found that the plastic film, or tape which is used in accordance with this invention has to be able to stand temperatures of 300° to 600° Fahrenheit for at least a short period of time, must be scuff resistant, and of relatively high tensile strength in order to endure subsequent fabrication, e.g. conversion of tubing into ironing board legs, lawn equipment, etc. I have found that polypropylene and high density polyethylene are not suitable for use as plastic film in accordance with this invention because they respond too drastically to the high temperatures involved in the method of this invention. I have found Mylar (DuPont trademark) and other terphthalic esters, Korad (Rohm and Haas trademark) and other acrylic tape polymers, Tedlar (DuPont trademark) and other polyvinyl fluoride films, Videne (Goodyear Chemical Co. trademark) and other polyesters are satisfactory as plastic film for use in accordance with this invention. It is preferred that the tape be subjected to compression, e.g. by silicone rubber nip-type roller, immediately upon contact with the heated surface.

While the embodiments of apparatus and method of this invention described above illustrate application to round tubing, the invention is also useful with square, rectangular and odd shaped tubes as well.

If the finish to be applied is a solid color finish the tape which is applied in accordance with this invention may be colored throughout rather than reverse printed, providing at least one surface thereof is at least partially fusible at temperatures between 300° and 600° Fahrenheit. In those embodiments of this invention in which the tape 22 is a monolayer of solid colored plastic, it is not essential that tape 22 include layer 27 of high melt adhesive, provided of course tape 22 be made of a plastic, which at least partially fuses in the temperature range 300° to 600° Fahrenheit and adhere to the substrate.

Thus, used as herein, the terms high melt adhesive and adhesive layer 27, are intended to include materials, generally considered to be "adhesives" which are activated by temperatures in the 300° to 600° Fahrenheit range, as well as fusible materials, such as inks and/or plastic materials which develop adhesion to heated metal to which it is applied. Thus, the "adhesive" can be a layer on the face of the tape or it can be an integral part of the tape.

Thus, in accordance with this invention elongated prefinished metal strip is converted in otherwise conventional equipment to completely finished butt welded tubing. The method is particularly useful in providing butt-welded tubing having a wood grain finish.

I claim:

1. The method of converting an elongated prefinished metal strip having a longitudinal axis into a finished welded tube, comprising the steps:
   a. advancing the strip in the direction of its longitudinal axis through shaping means for imparting a substantially circular cross section thereto, thereby brining the edges of said strip to abutting position;
   b. continuously welding together the edges of said strip thereby forming continuously tubing having a weld line, and thereby forming a heated region adjacent to and along both sides of the weld line; and applying a continuous organic tape to said weld line and to a portion of said heated region, said organic tape matching said prefinished metal strip in appearance and having a thickness between one-half and two mils and having a tube-contacting surface which is at least partially fusible and adherable at temperatures between 300° and 600° Fahrenheit, said applying step including initial contact between the tape and the tubing in that portion of the heated region at which temperature is low enough to be tolerated by the tape and yet is high enough to at least partially fuse the contacting surface so that it adheres to the tubing.

2. The method of claim 1 in which the tape includes a film of plastic selected from the group consisting of Mylar polyvinyl fluoride and polyester.

3. The method of claim 1 in which the tape has printing on the under side thereof, and includes a high melt adhesive on the printed side thereof said high melt adhesive being activated by temperatures between 300° and 600° Fahrenheit.

UNITED STATES PATENT OFFICE
CERTIFICATE OF CORRECTION

Patent No. 3,600,793          Dated August 24, 1971

Inventor(s)  John E. Masters

It is certified that error appears in the above-identified patent and that said Letters Patent are hereby corrected as shown below:

Abstract, line 4, cancel "matching".

Column 4, line 13, "brining" should read -- bringing --; line 16, "continuously" should read -- continuous --.

Signed and sealed this 14th day of March 1972.

(SEAL)
Attest:

EDWARD M. FLETCHER, JR.　　　　　　　　ROBERT GOTTSCHALK
Attesting Officer　　　　　　　　　　　Commissioner of Patents